(12) United States Patent
Haller et al.

(10) Patent No.: US 12,732,456 B2
(45) Date of Patent: Sep. 8, 2026

(54) FLEXIBLE PACKET PROCESSING INTERFACE

(71) Applicant: Mellanox Technologies, Ltd., Yokneam (IL)

(72) Inventors: Istvan Haller, Cambridge (GB); Omri Kahalon, Tel Aviv (IL); Krishna Garlapati, Los Gatos, CA (US); Stephen Warren, Fort Collins, CO (US); Avi Urman, Yokneam (IL)

(73) Assignee: Mellanox Technologies, Ltd, Yokneam (IL)

( * ) Notice: Subject to any disclaimer, the term of this patent is extended or adjusted under 35 U.S.C. 154(b) by 61 days.

(21) Appl. No.: 18/772,187

(22) Filed: Jul. 14, 2024

(65) Prior Publication Data

US 2026/0019361 A1 Jan. 15, 2026

(51) Int. Cl.
*H04L 45/00* (2022.01)
*H04L 49/90* (2022.01)
*H04L 69/22* (2022.01)

(52) U.S. Cl.
CPC .............. *H04L 45/56* (2013.01); *H04L 49/90* (2013.01); *H04L 69/22* (2013.01)

(58) Field of Classification Search
CPC ......... H04L 45/56; H04L 49/90; H04L 69/22; H04L 45/566
See application file for complete search history.

(56) References Cited

U.S. PATENT DOCUMENTS 9,740,464 B2 * 8/2017 Munshi .................. G06F 8/456
2004/0015905 A1 * 1/2004 Huima .................. G06F 8/656 717/141
2020/0004586 A1 1/2020 Dutu et al.

OTHER PUBLICATIONS

I. Chukhman et al., “Context-aware TLB Preloading for Interference Reduction in Embedded Multi-tasked Systems,” ACM, 2010, pp. 1-4.

* cited by examiner

*Primary Examiner* — Jude Jean Gilles
(74) *Attorney, Agent, or Firm* — Meitar Patents LTD.; Daniel Kligler

(57) ABSTRACT

In one embodiment, a network device includes a network interface to receive first packets from a network and send second packets over the network, a processing unit to execute software handlers, an input-output buffer to store data used by the processing unit, and packet processing hardware to parse a header of a packet and maintain metadata of the packet, determine an action to be performed for the packet including calling a given software handler, transfer at least one region of the metadata to the input-output buffer based on a handler configuration of the given software handler, and call the given software handler to perform processing associated with the packet, wherein the processing unit is to execute the given software handler, which is to perform processing based on the transferred at least one region of the metadata.

17 Claims, 9 Drawing Sheets

10
38
40
HOST DEVICE
MEMORY
NETWORK DEVICE
HOST INTERFACE
16
PROCESSING UNIT
18
PROC. CORE
34
PROC. CORE
34
PROC. CORE
34
12
32
I/O BUFFER
42
24
SCHEDULER
26
22
30
MEMORY SETUP
MATCH-AND-ACTION TABLE(S)
MATCH AND ACTION
BUILDER
28
SOFTWARE ACTIVATION HARDWARE
PACKET PROCESSING HARDWARE
20
PARSING
14
NETWORK INTERFACE
36

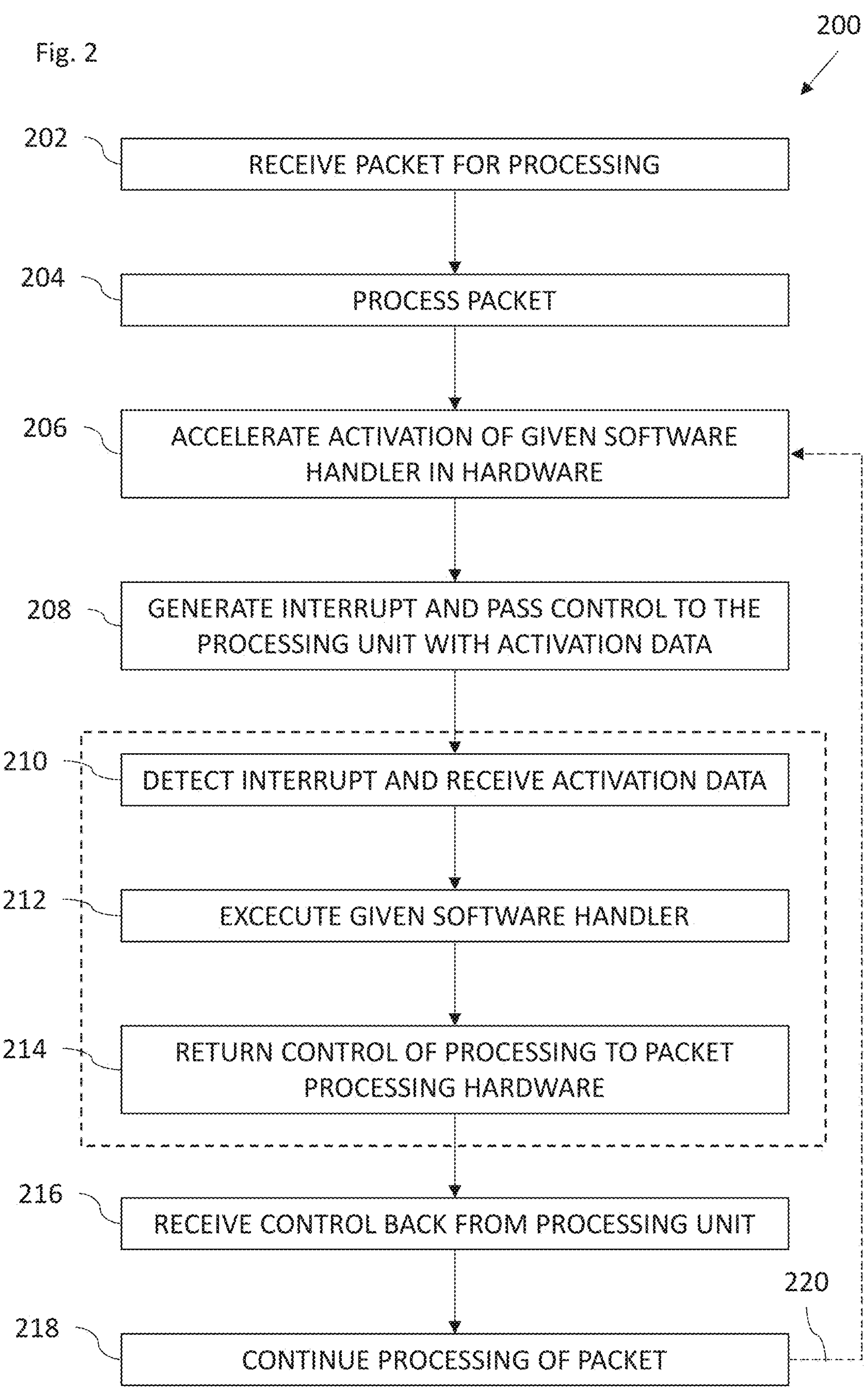
Fig. 2
200
202
RECEIVE PACKET FOR PROCESSING
204
PROCESS PACKET
206
ACCELERATE ACTIVATION OF GIVEN SOFTWARE HANDLER IN HARDWARE
208
GENERATE INTERRUPT AND PASS CONTROL TO THE PROCESSING UNIT WITH ACTIVATION DATA
210
DETECT INTERRUPT AND RECEIVE ACTIVATION DATA
212
EXECUTE GIVEN SOFTWARE HANDLER
214
RETURN CONTROL OF PROCESSING TO PACKET PROCESSING HARDWARE
216
RECEIVE CONTROL BACK FROM PROCESSING UNIT
218
CONTINUE PROCESSING OF PACKET
220

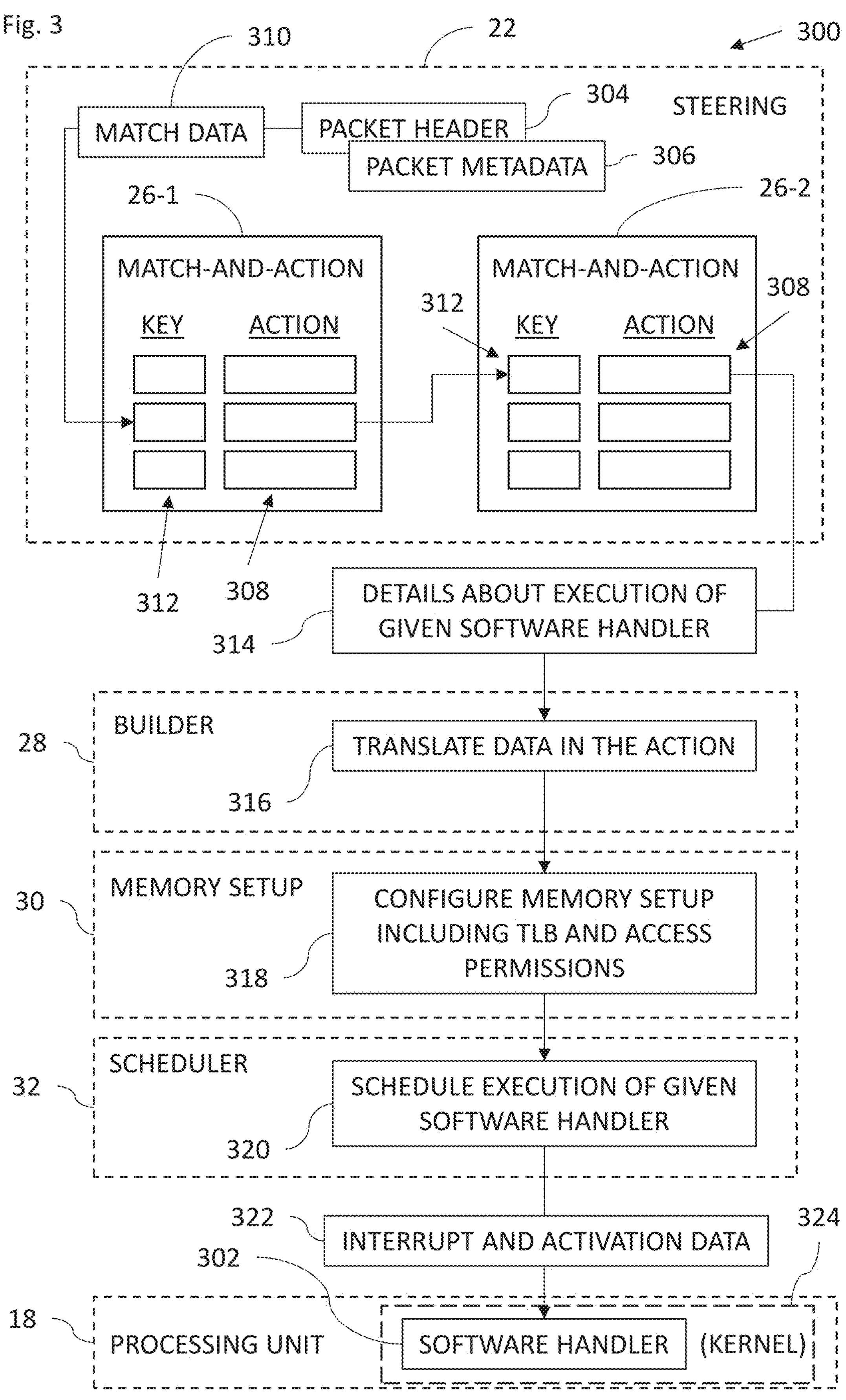

Fig. 3
310
22
300
304
STEERING
MATCH DATA
PACKET HEADER
PACKET METADATA
306
26-1
26-2
MATCH-AND-ACTION
KEY
ACTION
312
308
MATCH-AND-ACTION
KEY
ACTION
308
312
308
DETAILS ABOUT EXECUTION OF GIVEN SOFTWARE HANDLER
314
28
BUILDER
TRANSLATE DATA IN THE ACTION
316
30
MEMORY SETUP
CONFIGURE MEMORY SETUP INCLUDING TLB AND ACCESS PERMISSIONS
318
32
SCHEDULER
SCHEDULE EXECUTION OF GIVEN SOFTWARE HANDLER
320
322
INTERRUPT AND ACTIVATION DATA
324
302
18
PROCESSING UNIT
SOFTWARE HANDLER
(KERNEL)

400

402
TRACK USE OF PROCESSING UNIT (BY CORE)
404
FIND FREE HARDWARE THREAD
406
MAINTAIN LIST OF PENDING SOFTWARE HANDLER EXECUTION REQUESTS
408
PROVIDE ACTIVATION DATA TO PROCESSING UNIT
410
GENERATE INTERRUPT
(TO A GIVEN ONE OF THE PROCESSING CORES)

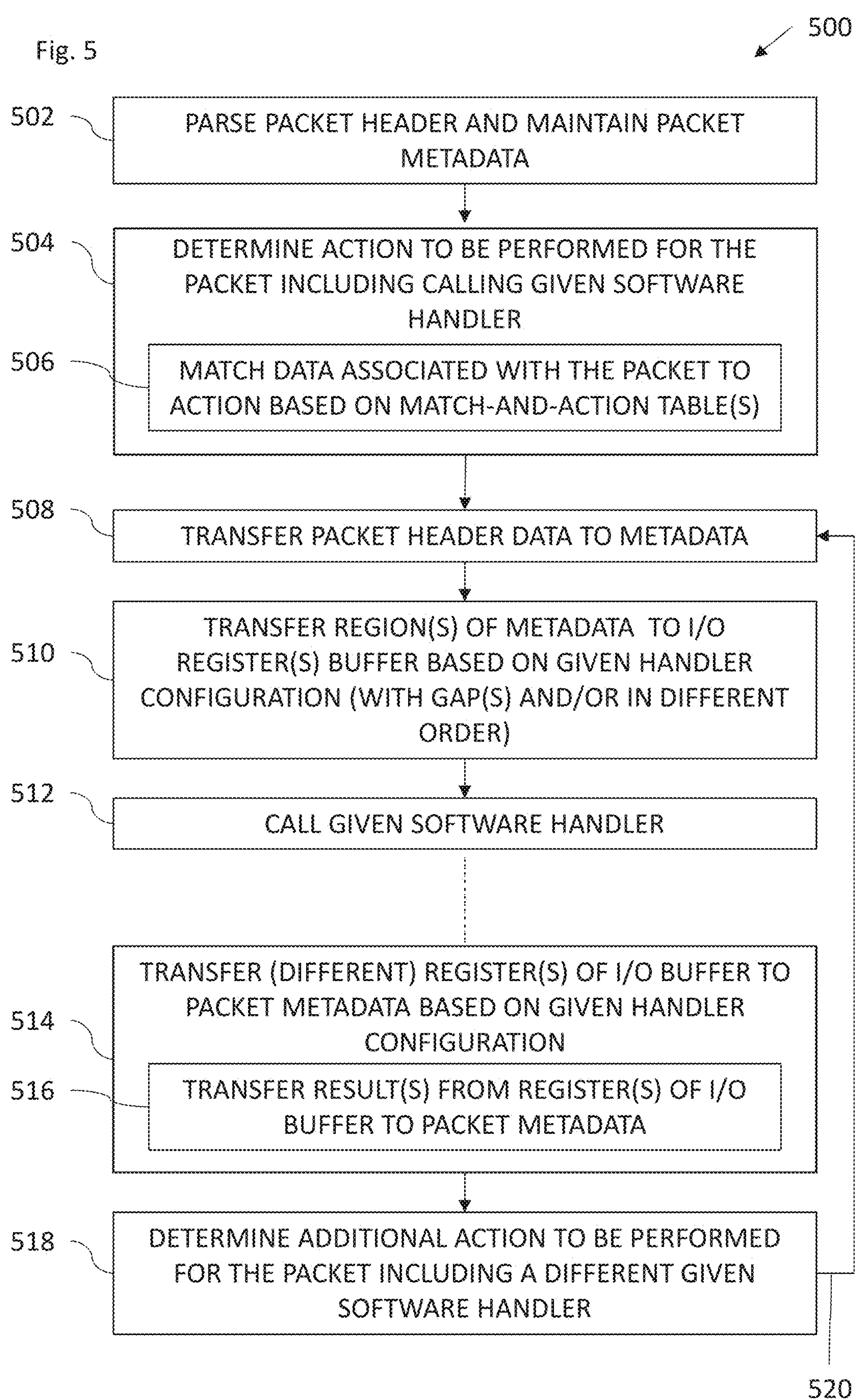
Fig. 5
500
502
PARSE PACKET HEADER AND MAINTAIN PACKET METADATA
504
DETERMINE ACTION TO BE PERFORMED FOR THE PACKET INCLUDING CALLING GIVEN SOFTWARE HANDLER
506
MATCH DATA ASSOCIATED WITH THE PACKET TO ACTION BASED ON MATCH-AND-ACTION TABLE(S)
508
TRANSFER PACKET HEADER DATA TO METADATA
510
TRANSFER REGION(S) OF METADATA TO I/O REGISTER(S) BUFFER BASED ON GIVEN HANDLER CONFIGURATION (WITH GAP(S) AND/OR IN DIFFERENT ORDER)
512
CALL GIVEN SOFTWARE HANDLER
514
TRANSFER (DIFFERENT) REGISTER(S) OF I/O BUFFER TO PACKET METADATA BASED ON GIVEN HANDLER CONFIGURATION
516
TRANSFER RESULT(S) FROM REGISTER(S) OF I/O BUFFER TO PACKET METADATA
518
DETERMINE ADDITIONAL ACTION TO BE PERFORMED FOR THE PACKET INCLUDING A DIFFERENT GIVEN SOFTWARE HANDLER
520

602
PACKET
20
PARSING CIRCUITRY
PACKET PROCESSING CIRCUITRY
604
606
PACKET METADATA
PACKET HEADERS
608
STEERING ACTIONS
PACKET METADATA
PACKET HEADERS
600
18
42
PROCESSING UNIT
SOFTWARE HANDLER
I/O BUFFER
614
606
616
604
PIPELINE
EXECUTE HANDLER
618
610
606
PACKET METADATA
620
STEERING ACTIONS
606
604
PACKET METADATA
PACKET HEADERS
622
UPDATED PACKET AND STEERING DECISION 700
702
EXECUTE GIVEN SOFTWARE HANDLER
704
READ DATA FROM I/O BUFFER
706
COMPUTE RESULT(S) BASED ON READ DATA
708
WRITE RESULT(S) TO I/O BUFFER
710
COMPLETE PROCESSING 800
802
F1
F2
F3
PARSED PACKET HEADER BEFORE ACTION
804
806
806
606
HC
F1
F2
PACKET METADATA BEFORE EXECUTION
808
808
42
F2
F1
810
812
810
I/O BUFFER BEFORE EXECUTION
610
SOFTWARE HANDLER
816
816
42
F2'
F3'
804
818
814
818
I/O BUFFER AFTER EXECUTION
606
HC
F1
F2'
F3'
PACKET METADATA AFTER EXECUTION
820
820
802
F1
F2'
F3'
PARSED PACKET HEADER AFTER ACTION

FLEXIBLE PACKET PROCESSING INTERFACE

FIELD OF THE DISCLOSURE

The present disclosure relates to computer systems, and in particular, but not exclusively to, packet processing.

BACKGROUND

A network interface controller (NIC) (referred to in certain networks as a host bus adapter (HBA) or host channel adapter (HCA)) is a unit which manages the communications between a computer (e.g., a server) and a network, such as a local area network or switch fabric. The NIC directs packets from the network to their destination in the computer, for example by placing the packets in a buffer of a destination application in a memory unit of the computer and directs outgoing packets, for example sending them either to the network or to a loopback port. The directing of packets to their destination is generally referred to as packet steering, which includes determining a required destination of the packet and forwarding the packet to its destination. The NIC may implement a hash function using 5-tuple header information as input to a steering table to reach a forwarding decision. The action indicated by the steering table may direct the steering to another steering table, and so on. The actions may include forwarding, dropping, amending a header, encapsulation, decapsulation, rewrite, smooth, switch, or sort, for example.

SUMMARY

There is provided in accordance with an embodiment of the present disclosure, a network device, including a network interface to receive first packets from a network and send second packets over the network, a processing unit to execute software handlers, an input-output buffer to store data used by the processing unit, and packet processing hardware to parse a header of a packet and maintain metadata of the packet, determine an action to be performed for the packet including calling a given software handler, transfer at least one region of the metadata to the input-output buffer based on a handler configuration of the given software handler, and call the given software handler to perform processing associated with the packet, wherein the processing unit is to execute the given software handler, which is to perform processing based on the transferred at least one region of the metadata.

Further in accordance with an embodiment of the present disclosure the packet processing hardware is to in response to the given software handler completing the processing associated with the packet, transfer at least one first register of the input-output buffer to the packet metadata based on the handler configuration of the given software handler, and continue processing the packet.

Still further in accordance with an embodiment of the present disclosure the packet metadata includes a plurality of regions, the input-output buffer includes a plurality of registers, and the handler configuration defines (i) only a subset of the plurality of regions of the packet metadata to be transferred to the input-output buffer, and (ii) only a subset of the plurality of registers of the input-output buffer to be transferred back to the packet metadata.

Additionally in accordance with an embodiment of the present disclosure the packet processing hardware is to transfer the at least one region of the metadata to at least one second register of the input-output buffer based on the handler configuration, and transfer the at least one first register of the input-output buffer to the packet metadata, wherein the at least one first register is different from the at least one second register.

Moreover, in accordance with an embodiment of the present disclosure the packet processing hardware is to transfer the at least one region of the metadata to the at least one second register based on the handler configuration such that there is a gap between the data in the input-output buffer that did not exist in the data in the metadata.

Further in accordance with an embodiment of the present disclosure the packet processing hardware is to transfer the at least one region of the metadata to the at least one second register based on the handler configuration such that the data is written to the input-output buffer in a different order than the data is stored in the packet metadata.

Still further in accordance with an embodiment of the present disclosure the packet processing hardware is to determine an additional action to be performed for the packet including calling a second software handler, transfer at least a second region of the metadata to the input-output buffer based on a second handler configuration of the second software handler, and call the second software handler to perform processing associated with the packet, the processing unit is to execute the second software handler, which is to perform processing based on the transferred at least second region of the metadata, and the packet processing hardware is to, in response to the second software handler completing the processing associated with the packet, transfer at least one third register of the input-output buffer to the packet metadata based on the second handler configuration of the second software handler.

Additionally in accordance with an embodiment of the present disclosure the processing unit is to execute the given software handler to read the data from the input-output buffer, compute at least one result based on the read data, and write the at least one result to the input-output buffer.

Moreover, in accordance with an embodiment of the present disclosure the packet processing hardware is to transfer at least part of the at least one result to packet metadata.

Further in accordance with an embodiment of the present disclosure the packet processing hardware is to transfer header data from the header of the packet to the metadata based on handler specific configuration data, the transferred header data being used by the given software handler.

Still further in accordance with an embodiment of the present disclosure the packet processing hardware is to match data associated with the packet to the action responsively to at least one match-and-action table, and the action indicates details about execution of the given software handler.

There is also provided in accordance with still another embodiment of the present disclosure a device, including a compiler to receive source code for different software handlers, and perform compilation processes to (a) compile the source code of the different software handlers to yield respective compiled software handlers, and (b) define different hardware-software interfaces between a hardware processor and a processing unit for use by the respective compiled software handlers, and a memory to store the compiled software handlers.

Additionally, in accordance with an embodiment of the present disclosure the hardware processor includes packet processing hardware, and the compiled software handlers are to perform packet processing tasks.

There is also provided in accordance with another embodiment of the present disclosure, a method, including receiving first packets from a network, sending second packets over the network, executing software handlers, parsing a header of a packet, maintaining metadata of the packet, determining an action to be performed for the packet including calling a given software handler, transferring at least one region of the metadata to an input-output buffer based on a handler configuration of the given software handler, calling the given software handler to perform processing associated with the packet, and executing the given software handler to perform processing based on the transferred at least one region of the metadata.

Moreover, in accordance with an embodiment of the present disclosure, the method includes in response to the given software handler completing the processing associated with the packet, transferring at least one first register of the input-output buffer to the packet metadata based on the handler configuration of the given software handler, and continuing processing the packet.

Further in accordance with an embodiment of the present disclosure the packet metadata includes a plurality of regions, the input-output buffer includes a plurality of registers, and the handler configuration defines (i) only a subset of the plurality of regions of the packet metadata to be transferred to the input-output buffer, and (ii) only a subset of the plurality of registers of the input-output buffer to be transferred back to the packet metadata, the transferring the at least one region includes transferring the at least one region of the metadata to at least one second register of the input-output buffer based on the handler configuration, and the transferring the at least one first register includes transferring the at least one first register of the input-output buffer to the packet metadata, wherein the at least one first register is different from the at least one second register.

Still further in accordance with an embodiment of the present disclosure the transferring the at least one region includes transferring the at least one region of the metadata to the at least one second register based on the handler configuration such that there is a gap between the data in the input-output buffer that did not exist in the data in the metadata.

Additionally in accordance with an embodiment of the present disclosure the transferring the at least one region includes transferring the at least one region of the metadata to the at least one second register based on the handler configuration such that the data is written to the input-output buffer in a different order than the data is stored in the packet metadata.

Moreover, in accordance with an embodiment of the present disclosure, the method includes determining an additional action to be performed for the packet including calling a second software handler, transferring at least a second region of the metadata to the input-output buffer based on a second handler configuration of the second software handler, and calling the second software handler to perform processing associated with the packet, executing the second software handler to perform processing based on the transferred at least second region of the metadata, and in response to the second software handler completing the processing associated with the packet, transferring at least one third register of the input-output buffer to the packet metadata based on the second handler configuration of the second software handler.

There is also provided in accordance with still another embodiment of the present disclosure a method, including receiving source code for different software handlers, performing compilation processes to (a) compile the source code of the different software handlers to yield respective compiled software handlers, and (b) define different hardware-software interfaces between a hardware processor and a processing unit for use by the respective compiled software handlers, and storing the compiled software handlers.

Further in accordance with an embodiment of the present disclosure the compiled software handlers are to perform packet processing tasks.

BRIEF DESCRIPTION OF THE DRAWINGS

The present disclosure will be understood from the following detailed description, taken in conjunction with the drawings in which:

FIG. 2 is a flowchart including steps in a method of processing a packet in the network device of FIG. 1;

FIG. 3 is a block diagram showing hardware activation of a software handler in the network device of FIG. 1;

FIG. 5 is a flowchart including steps in a method of processing a packet in the network device of FIG. 1 with a focus on metadata handling;

DESCRIPTION OF EXAMPLE EMBODIMENTS

Overview

Figure 1:
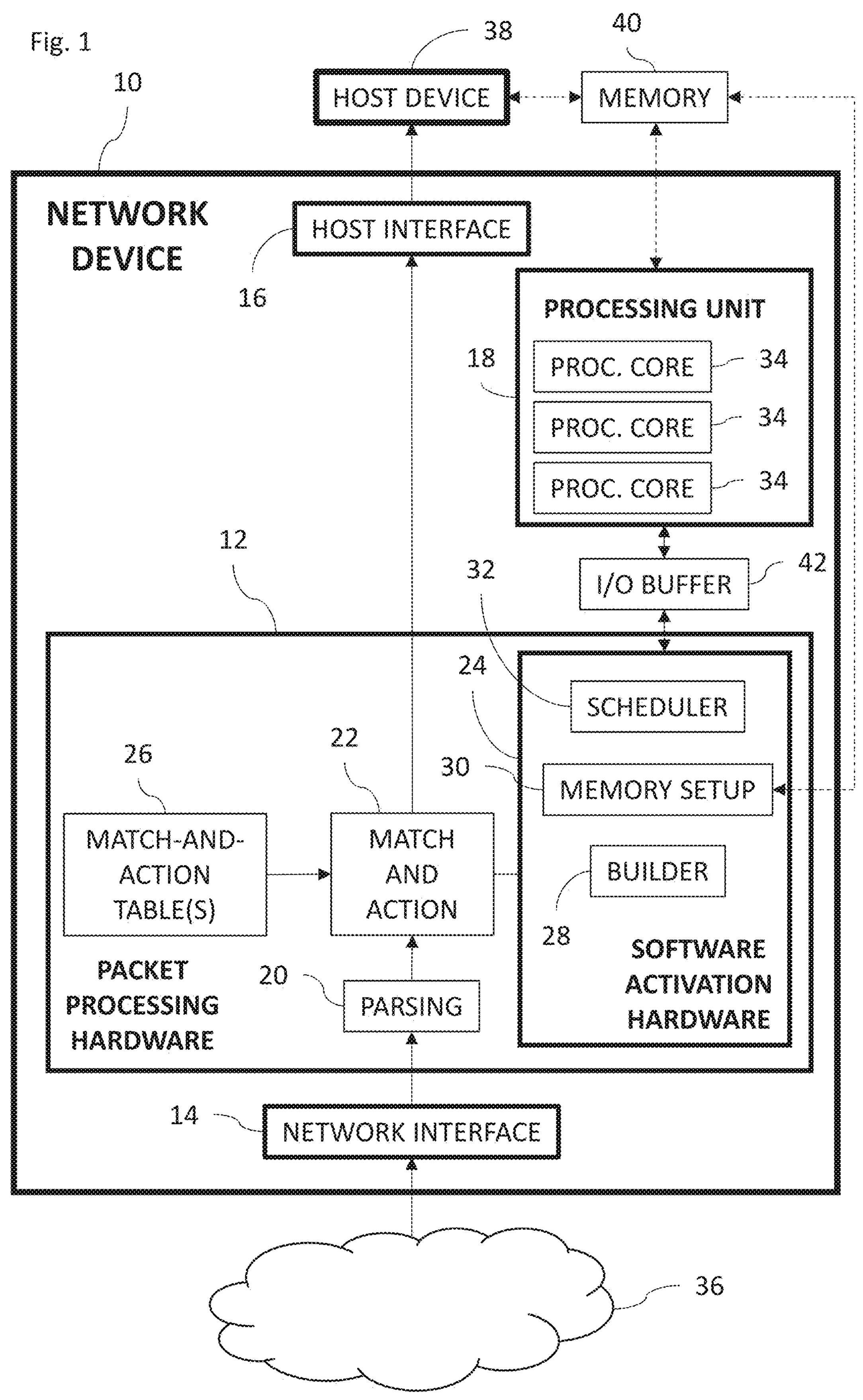
FIG. 1 is a block diagram view of a network device constructed and operative in accordance with an embodiment of the present invention.

As previously mentioned, a network device such as a NIC performs packet steering typically as part of packet processing. The steering process may be performed in hardware, for example, in an application-specific integrated circuit (ASIC). Such processing may be inflexible as the steering functionality is typically fixed to a large degree when the ASIC is manufactured. Therefore, if new steering functionality is needed after the ASIC is manufactured, the options may be to replace the ASIC, or forgo the new steering functionality.

One solution is to design an ASIC or packet processing engine which is integrated with a processing unit (e.g., a central processing unit comprising processing cores such as RISC-V) which runs software. The ASIC has built-in functionality to be able to request an external software program to be executed on the processor unit from the steering function within the ASIC so that if new steering functionality is needed, it may be implemented in software, which is run on the processing unit. For example, in the packet processing pipeline a packet header may be parsed and match-and-action tables searched to yield actions on the packet. During this time the packet header and/or packet metadata (which is stored in the pipeline) may be updated. Sometimes an action will call a software handler (run by a processor with or without an operating system), to perform computations based on all or part of the packet metadata. The software handler may then update at least some of the packet metadata based on the computation(s). As part of the process, all the packet metadata may be passed to the handler and all of the handler buffer is transferred back to the packet metadata. Transferring all the data may result in data being overwritten which should persist, as well as wasting processing resources when only a subset of the metadata is needed. At the end of the process, control of the processing of that packet returns to the packet processing pipeline and the process continues with the updated packet metadata. There may also be copy operations between the packet header and packet metadata in one or both directions.

Embodiments of the present disclosure address at least some of these drawbacks by providing a handler configuration per software handler which specifies which region (or regions) of the packet metadata is to be transferred (e.g. copied) to the input/output buffer of the processor executing that software handler and which register(s) is to be transferred from the input/output buffer to the packet metadata at completion of execution of that software handler. Therefore, packet metadata is copied on a per handler basis to the handler register(s). In this manner, resources such as energy and/or clock cycles (i.e. latency) may be saved by not transferring unnecessary data. Additionally, packet metadata may be preserved (i.e., not overwritten) thereby allowing more complex flow processing. Moreover, more of the input-output buffer is available to the processing unit (e.g., processor) running the software handlers as an additional resource to be used to optimize execution of the software handlers.

Data to be used by software handler that is not already in the metadata may be copied into the metadata (e.g., based on some match-and-action action) from the packet header data, and data in the packet metadata may optionally copied back to the packet header after completion of execution of the software handler. Some or all of the packet metadata is copied to registers of the input/output (I/O) buffer prior to execution of a given software handler according to the handler configuration of the given software handler. The software handler reads data from the I/O buffer and computes one or more results from the read data and writes result data to the I/O buffer. Packet processing hardware copies relevant register(s) of the I/O buffer back to the packet metadata after completion of execution of the given software handler and control of the processing of that packet returns to the packet processing pipeline.

In some embodiments, multiple and/or different software handlers may be called for a single packet. Different software handlers may use different data from the metadata and write different data to the registers of the I/O buffer. Therefore, in some embodiments, the number and identity of data region(s) copied from the packet metadata to the register(s) of the I/O buffer and to where the data region(s) is copied to in the registers (i.e., the data may be copied from the metadata to the I/O buffer with gaps or in a different order etc.) may be different for different software handlers. Therefore, each software handler may have a different handler configuration specifying what data is copied from the metadata to the I/O buffer and how the data is copied (i.e., with gaps and the order of the data) and what data is copied back from the metadata to the I/O buffer and how the data is copied back (i.e., the order of the data). The handler configuration for each software handler called by the packet processing hardware may be copied into the packet metadata (e.g., based on an action(s) derived from one or more match-and-action table(s)).

In some embodiments, instead of using a hardware-software agreement to define how data in the registers of the I/O buffer should be configured, when a given software handler code is written and compiled, the compiler determines best register usage (e.g., the input and output register configuration of the I/O buffer) which works for the given software handler without any concern for any prior defined hardware-software agreement. The register configuration defined by the compiler for the given handler defines the handler configuration for the given software handler and may be saved, e.g., into the binary of the given software handler. In this manner, the compiler provides different hardware-software interfaces for respective software handlers.

System Description

Reference is now made to FIG. 1, which is a block diagram view of a network device 10 constructed and operative in accordance with an embodiment of the present invention. Network device 10 includes packet processing hardware 12, a network interface 14, a host interface 16, input-output buffer 42, and a processing unit 18. Network interface 14 is configured to receive packets from a network 36 and send packets over network 36. The host interface 16 is configured to send at least some of the received packets to a host device 38 and receive packets from the host device 38, e.g., for sending over the network 36. The network device 10 and/or the host device 38 may store data to, and/or retrieve data from, a shared memory 40. Memory 40 may be used to store packets, metadata about the packets, and other data, for example, software code executed by the processing unit 18 and states of the packet processing hardware 12. The processing unit 18 may include any suitable processor (e.g., RISC-V) configured to execute software handlers. The processing unit 18 may include one or multiple processing cores 34.

Packet processing hardware 12 may include a physical layer (PHY) unit (not shown), a MAC unit (not shown) and other packet processing elements (not shown). Packet processing hardware 12 may be implemented as an ASIC or, alternatively, implemented using multiple physical components. The packet processing hardware 12 also includes parsing circuitry 20, match and action circuitry 22, and software activation hardware 24. Parsing circuitry 20 is configured to parse headers of packets into sections. The match and action circuitry 22 is configured to match sections of the headers or other packet data or metadata to keys in match-and-action tables 26 to determine how to further process the packet. The actions may include forwarding, dropping, amending a header, encapsulation, decapsulation, rewrite, smooth, switch, or sort, for example. The actions may include calling software handler(s) to execute on processing unit 18. The processing unit 18 may be configured to execute software handlers with, or without, an operating system.

Software activation hardware 24 includes elements to accelerate activation of software handlers in hardware. The software activation hardware 24 includes activation context builder hardware 28, memory setup hardware 30, and scheduler hardware 32. The software activation hardware 24 is described in more detail with reference to FIGS. 3 and 4.

The input-output buffer 42 may be configured to store data used by the processing unit 18. The packet processing hardware 12 is configured to transfer relevant data to the processing unit 18 and receive processed data from the processing unit 18 via the input-output buffer 42. The input-output buffer 42 is described in more detail with reference to FIGS. 5-10.

Reference is now made to FIG. 2, which is a flowchart 200 including steps in a method of processing a packet in the network device 10 of FIG. 1. The packet processing hardware 12 is configured to receive a packet for processing (block 202) and process the packet (block 204). The software activation hardware 24 of the packet processing hardware 12 is configured to accelerate activation of a given software handler by performing one or more activation tasks of the given software handler in hardware (block 206) and generate an interrupt to request the processing unit 18 (e.g., a given processing core 34 of the processing unit 18) to execute the given software handler to perform processing associated with the packet (block 208). The steps of blocks 206 and 208 are described in more detail with reference to FIGS. 3 and 4.

The processing unit 18 (e.g., the given processing core 34 of the processing unit 18) is configured to detect the interrupt signal and receive/retrieve activation data from the software activation hardware 24 (block 210). The processing unit 18 (e.g., the given processing core 34 of the processing unit 18) is configured to execute the given software handler and perform processing associated with the packet, responsively to the activation task(s) (e.g., activation data) performed by the software activation hardware 24 of the packet processing hardware 12 (block 212). The given software handler may have a predetermined runtime. The processing unit 18 (e.g., the given processing core 34 of the processing unit 18) is configured to execute the given software handler until completion of the given software handler and return control of processing the packet to the packet processing hardware (block 214). The given software handler may process data of the packet header or metadata of the packet, for example, as described in more detail with reference to FIGS. 5-8.

The software activation hardware 24 of the packet processing hardware 12 is configured to receive control back from the processing unit 18 (block 216) and signal the packet processing hardware 12, which is configured to continue processing the packet responsively to the completion of the execution of the given software handler (block 218).

In some embodiments, the packet processing hardware 12 is configured to invoke the processing unit successively (one-after the other, with or without processing gaps) multiple times (arrow 220) for the same packet to execute at least one software handler to perform processing associated with the packet (blocks 206-208). The same software handler may be invoked each time or different software handlers may be invoked. Therefore, processing unit 18 is configured to successively execute the software handler(s) and perform processing associated with the same packet (blocks 210-214).

Reference is now made to FIG. 3, which is a block diagram 300 showing hardware activation of a software handler 302 in the network device 10 of FIG. 1. When a packet is processed in the packet processing hardware 12, the match and action circuitry 22 of the packet processing hardware 12 matches (block 310) data associated with the packet (e.g., a packet header 304 and/or packet metadata 306, e.g., data about the packet being processed and generated during packet processing) to one or more match-and-action tables 26. Match-and-action tables 26 provide suitable actions 308 to be performed on packets or their metadata. The data associated with the packet, or a hash thereof, may be matched to a key 312 of one of the match-and-action tables 26-1 to yield a corresponding action 308. The action 308 may indicate another match-and-action table 26-2 on which to match data of the packet to a key of that match-and-action table 26-2, or may indicate a process that should be performed. The same may occur with the second table (i.e., that the action refers to another match-and-action table 26), and so on.

For a given packet, a matched action may specify that a given software handler should be executed by the processing unit 18 based on given data (e.g., packet header 304 or packet metadata 306). The actions may be encoded to keep the data included in the actions as compact as possible. The matched action may indicate details 314 about execution of the given software handler. The details about the given software handler may include any one or more of the following: a handler identifier (e.g., to a handler counter or the handler counter itself) of the given software handler; control parameters (e.g., regarding privileges) for use in executing the given software handler (as the handler runtime is predetermined); address space information (e.g., pointing to the packet, the packet header, packet metadata, states, etc. in memory), for use in executing the given software handler; and a stack identifier of a stack region for use in executing the given software handler. The address space information may indicate a global virtual machine identifier (GVMI) region of the given software handler. The GVMI region may be shared by multiple software handlers and the GVMI region is sub-divided among the software handlers.

As previously mentioned, the details 314 included in the actions may be encoded to keep the data included in the actions as compact as possible. Therefore, activation context builder hardware 28 is configured to translate at least some of the data of the details 314 in the matched action to data readable by the processing unit 18 (block 316) and optionally for other hardware of the packet processing hardware 12, such as the memory setup hardware 30 and the scheduler hardware 32.

As the form of the address space used by the different software handlers is known, and runtime of the given software handler 302 may be predetermined, in some embodiments, the memory setup hardware 30 performs memory setup tasks as part of the software activation. The memory setup hardware 30 is configured to configure a translation lookaside buffer (TLB) based on address space information indicated in the matched action (block 318). The TLB is responsible for translating virtual to physical addresses and provides protection when accessing virtual memory. The memory setup hardware 30 may also be configured to configure memory access permissions based on control parameters and address space information indicated in the matched action (block 318).

The scheduler hardware 32 is configured to schedule execution of the given software handler 302 (block 320). The scheduler hardware 32 is configured to provide activation data to the processing unit 18 and generates an interrupt signal for detection by the processing unit 18 (block 322). The scheduler hardware 32 is described in more detail with reference to FIG. 4.

In some embodiments, the processing unit 18 is configured to execute the given software handler 302 without an underlying kernel. In some embodiments, the processing unit 18 is configured to execute a kernel 324 on which to execute the given software handler 302.

Figure 4:
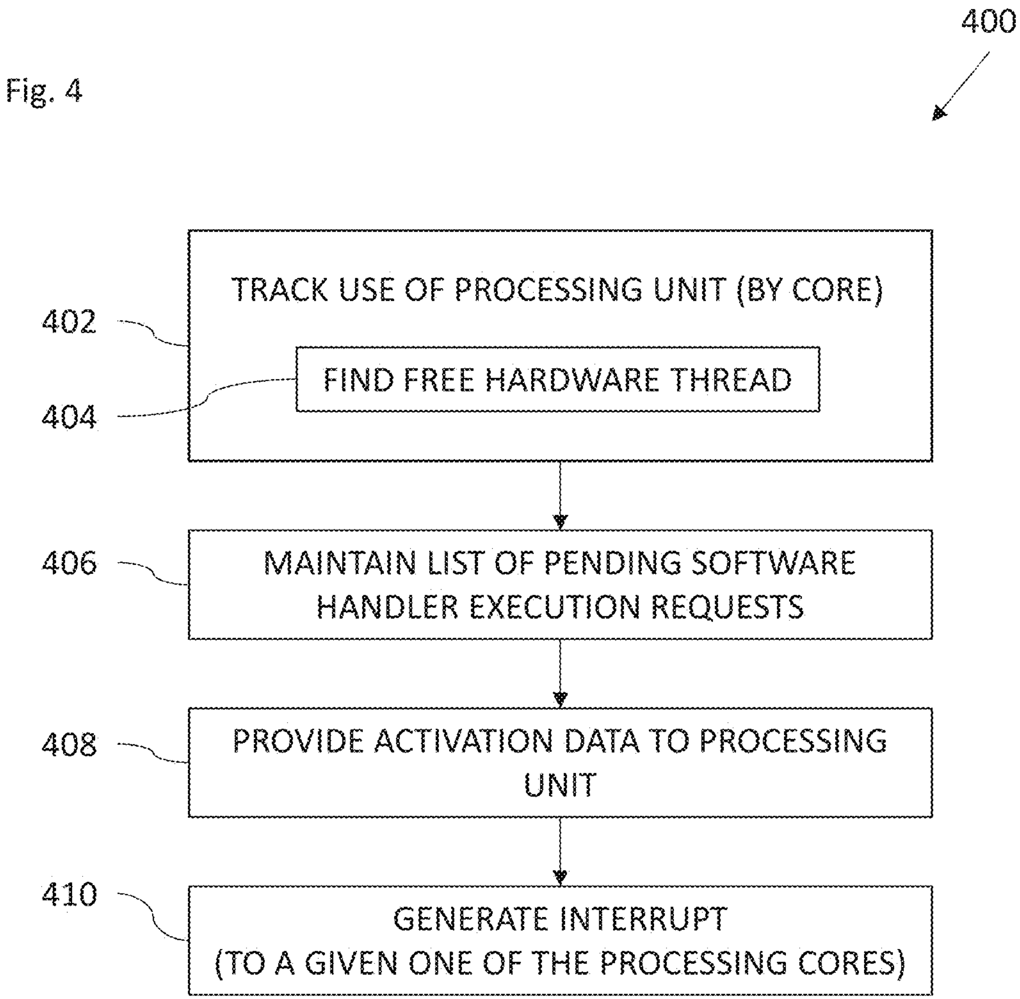
FIG. 4 is a flowchart including steps in a method of operation of scheduler hardware in the network device of FIG. 1.

Reference is now made to FIG. 4, which is a flowchart 400 including steps in a method of operation of scheduler hardware 32 in the network device 10 of FIG. 1. Scheduling may be simplified when the software handler has a predetermined runtime and control returns to the scheduler hardware 32 of the packet processing hardware 12 at the completion of execution. The scheduler hardware 32 is configured to track use of the processing unit 18 (block 402). In some embodiments, the scheduler hardware 32 is configured to track use of the processing cores 34. As part of the tracking, the scheduler hardware 32 is configured to find a free hardware thread of the processing unit 12 (e.g., in one of the processing cores 34) on which to run the software handler 302 (block 404). The scheduler hardware 32 is configured to maintain a list of pending software handler execution requests (block 406). The scheduler hardware 32 is configured to provide activation data (e.g., the data itself and/or a link or links to the data) for the given software handler 302 to the processing unit 302 (block 408).

The activation data provided to the processing unit 300 may include any one or more of the following: a handler identifier of the given software handler 302; a stack identifier of a stack region for use in executing the given software handler 302; address space information for use in executing the given software handler 302 (e.g., an internal state of the hardware processing hardware associated with the packet being processed, metadata accumulated in prior stages of packet processing, a state shared with the host device 38, a map of a state that is internal to the given software handler 302 that is going to be executed); control parameters for use in executing the given software handler 302; and a pointer to data of at least part of the packet (e.g., packet header 304 or metadata 306) being processed by the packet processing hardware 12. In some embodiments, providing activation data may include copying all, or some, of the packet metadata 306 to input-output buffer 42 according to a handler configuration of the given software handler 302, as described in more detail with reference to FIGS. 5-10.

In response to finding a free hardware thread, the scheduler hardware 32 is configured to select an interrupt type and generate an interrupt signal to request the processing unit 18 (or a given one of the processing cores 34 having the found free hardware thread) to execute the given software handler 302 on the found free hardware thread based on the activation data provided by the scheduler hardware 32 to the processing unit 18 (block 410).

On detecting the interrupt signal, the processing unit 18 executes the given software handler 302 based on the activation task(s) already performed in the packet processing hardware 12. In particular, the given software handler 302 starts execution with a mapped address memory space and can load and/or store the different memory regions in the mapped address memory space (e.g., including an internal state of the hardware processing hardware associated with the packet, metadata accumulated in prior stages of packet processing, a state shared with a host device, a map of a state that is internal to the given software handler that is going to be executed).

In practice, some, or all of the functions of the processing unit 18 may be combined in a single physical component or, alternatively, implemented using multiple physical components. These physical components may comprise hard-wired or programmable devices, or a combination of the two. In some embodiments, at least some of the functions of the processing unit 18 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

The network device 10 described above with reference to FIGS. 1-4 may be combined with the methods described below with reference to FIGS. 5-10, with suitable modifications. In some embodiments, the methods described below with reference to FIGS. 5-10 may be implemented with any suitable network device implementing any suitable methods to call one or more software handlers from packet processing hardware.

Figure 6:
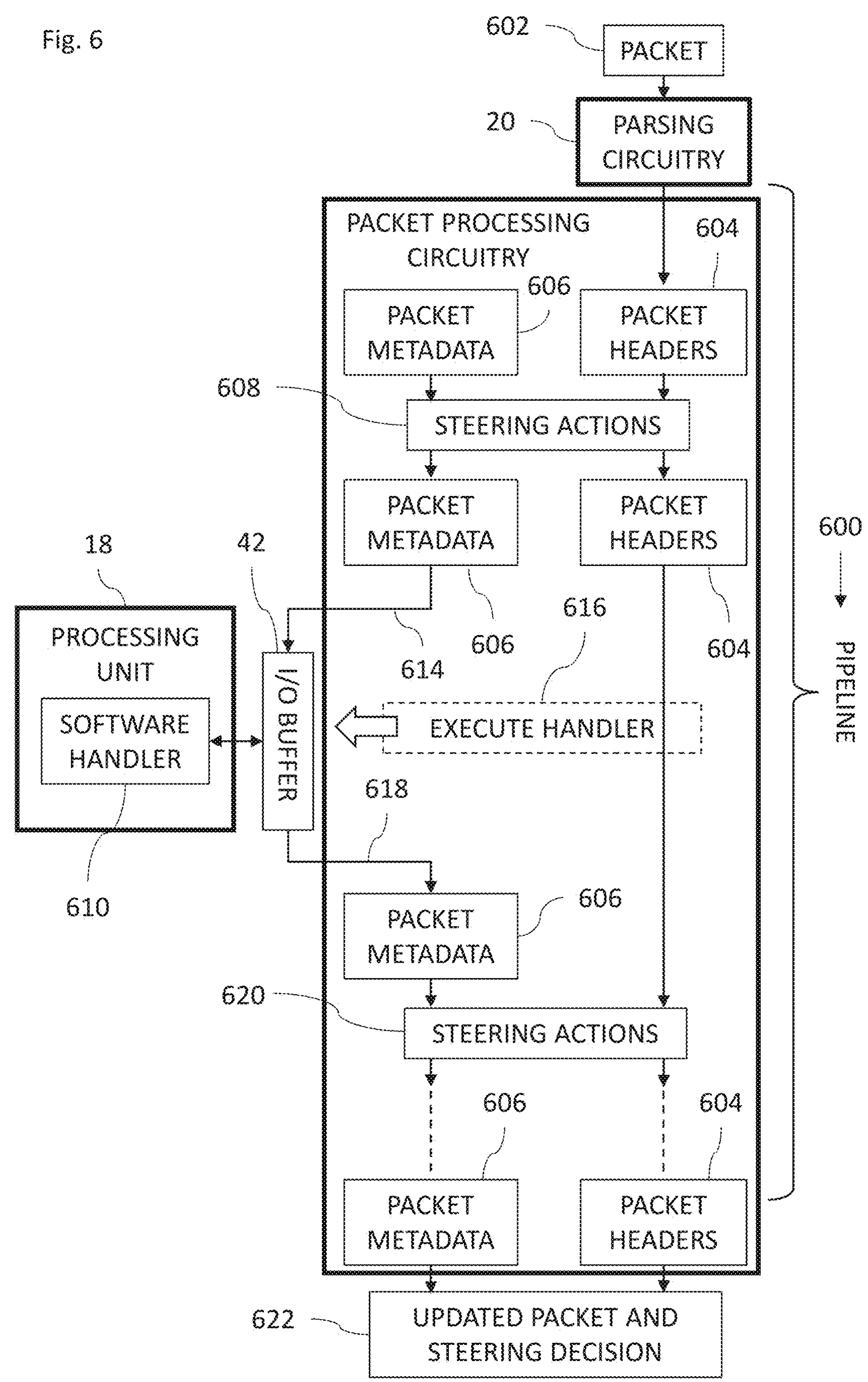
FIG. 6 is a schematic view of a packet processing pipeline illustrating the method of FIG. 5.

Reference is now made to FIGS. 5 and 6. FIG. 5 is a flowchart 500 including steps in a method of processing a packet in the network device 10 of FIG. 1 with a focus on metadata handling. Reference is now made to FIG. 6 is a schematic view of a packet processing pipeline 600 illustrating the method of FIG. 5.

The parsing circuitry 20 of the packet processing hardware 12 is configured to parse a header section of a packet 602 to yield packet headers 604 and maintain metadata 606 of the packet 602 (block 502). The packet processing hardware 12 is configured to determine one or more actions (block 608) to be performed for the packet 602 (block 504) including calling a given software handler 610, and transferring data from the packet headers 604 to the metadata 606, as described in more detail below. The action(s) may also include copying a handler configuration of the given software handler 610 to metadata 606. In some embodiments, as part of the step of block 504, the packet processing hardware 12 is configured to match data associated with the packet 602 (e.g., data from the packet headers 604 or based on the packet headers 604) to one or more actions responsively to match-and-action table(s) 26 (block 506) in order to determine the action(s) to be performed on the packet 602. The action(s) may indicate details about execution of the given software handler 610.

The packet processing hardware 12 is configured to transfer header data from the packet header(s) 604 to the metadata 606 based on handler specific configuration data (e.g., as part of the steering action(s) block 608) (block 508). The transferred header data may be used by the given software handler 610, as described below in more detail with reference to FIG. 8.

The packet processing hardware 12 is configured to transfer (arrow 614) one or more regions of the metadata 606 to one or registers of the input-output buffer 42 based on the handler configuration of the given software handler 610 (block 510). The handler configuration may define: (i) only a subset of the regions of the packet metadata 606 to be transferred to the input-output buffer 42 (prior to execution of the software handler 610); and (ii) only a subset of the registers of the input-output buffer 42 to be transferred back to the packet metadata 606 (after completion of execution of the software handler 610). In some embodiments, global context data (e.g., non-packet specific data) may also be copied into the input-output buffer 42 for use by the processing unit 18 during execution of the software handler 610.

Figure 8:
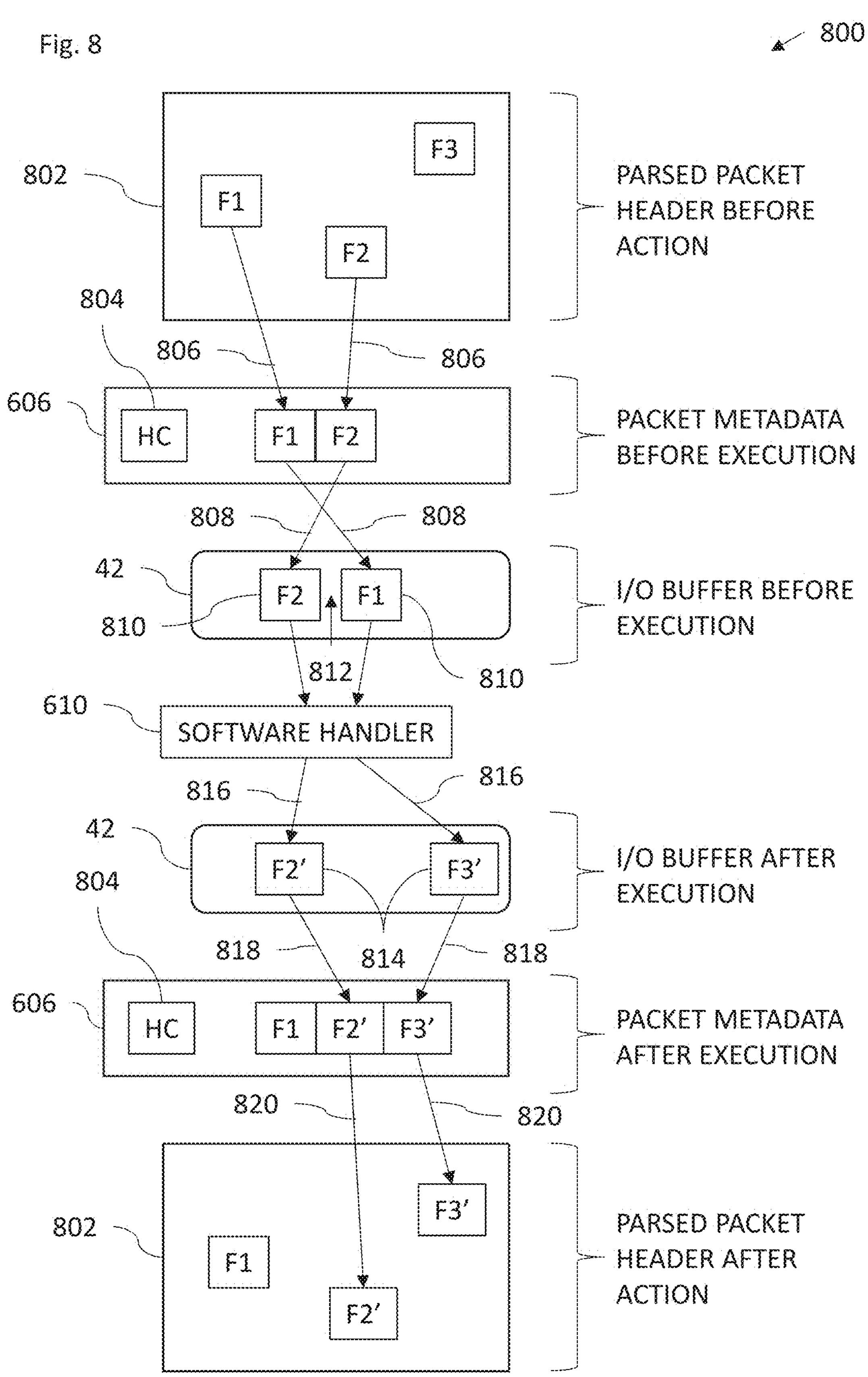
FIG. 8 is a dataflow diagram illustrating data handling according to the methods of FIGS. 5 and 7.

In some embodiments, the packet processing hardware 12 is configured to transfer the region(s) of the metadata 606 to the register(s) of input-output buffer 42 based on the handler configuration such that there is a gap between the data in the input-output buffer 42 (as shown in FIG. 8) that did not exist in the data in the metadata 606 (i.e., in the data transferred from metadata 606). In some embodiments, packet processing hardware 12 is configured to transfer the region(s) of the metadata 606 to the register(s) of input-output buffer 42 based on the handler configuration such that the data is written to the input-output buffer 42 in a different order than the data (which is being transferred) is stored in the packet metadata 606.

The packet processing hardware 12 is configured to call the given software handler 610 to perform processing associated with the packet 602 (block 512).

Figure 7:
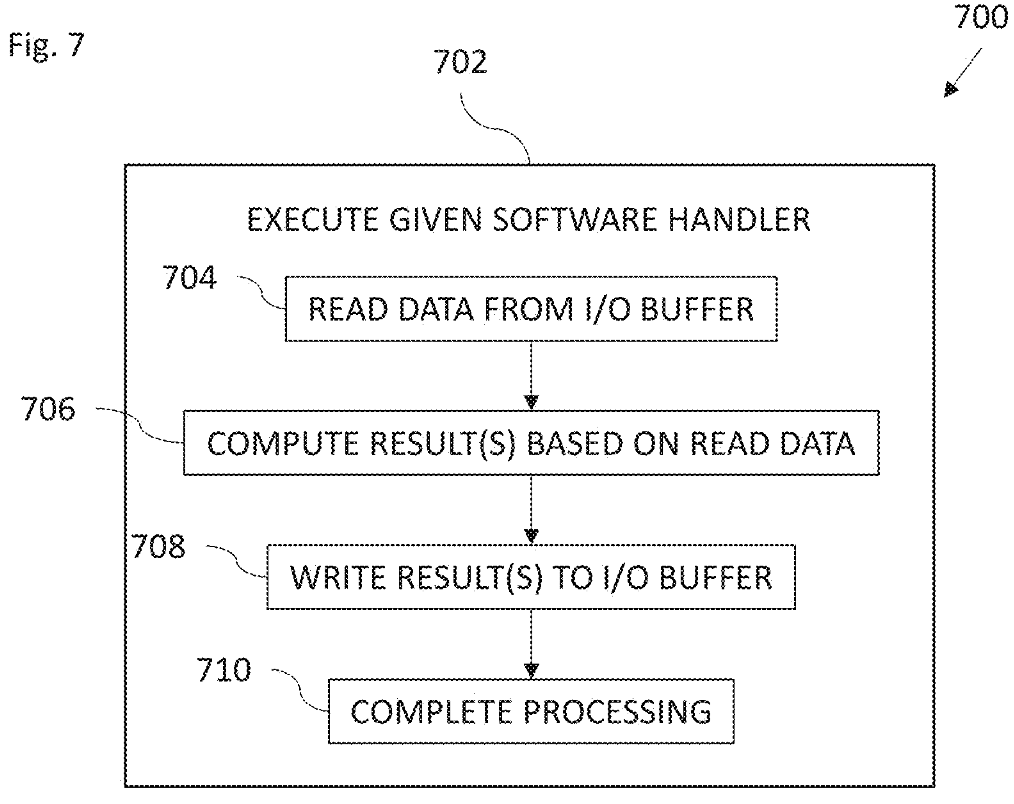
FIG. 7 is a flowchart including steps in a method performed by a processing unit in the network device of FIG. 1.

Reference is now made to FIG. 7, which is a flowchart 700 including steps in a method of performed by processing unit 18 in the network device 10 of FIG. 1. Reference is also made to FIG. 6. The processing unit is configured to execute the given software handler 610, which is to perform processing based on the region(s) of the metadata 606 transferred to input-output buffer 42 (block 702). Block 616 indicates that there is a break in the processing of packet 602 by the packet processing hardware 12 while the processing unit 18 is performing processing associated with packet 602. The processing unit is configured to execute the given software handler 610 to: read data from the input-output buffer 42 (block 704); compute one or more results based on the read data (block 706); write the result(s) to the input-output buffer 42 (block 708); and complete processing (block 710) and pass processing of the packet 602 back to the packet processing hardware 12.

Reference is again made to FIGS. 5 and 6.

In response to the given software handler 610 completing the processing associated with the packet 602, the packet processing hardware 12 is configured to transfer (arrow 618) one or registers of input-output buffer 42 to the packet metadata 606 based on the handler configuration of the given software handler 610 (block 514). It should be noted that the register(s) of input-output buffer 42 to which the metadata 606 was transferred prior to execution of software handler 610 may be different from the register(s) of input-output buffer 42 from which data is transferred back to the metadata 606 after completion of execution of software handler 610, as described in more detail with reference to FIG. 8. The step of block 514 may include the packet processing hardware 12 being configured to transfer one or more results computed by the software handler 610 from input-output buffer 42 to packet metadata 606 (block 516). The packet processing hardware 12 is configured to continue processing the packet 602.

The packet processing pipeline 600 of FIG. 6 only shows one software handler 610 performing processing on packet 602. It should be noted that more than one software handler may perform processing on packet 602 pursuant to one or more additional actions determined by packet processing hardware 12.

The packet processing hardware 12 may be configured to determine an additional action or actions (block 620) to be performed for the packet 602 including calling an additional different given software handler (block 518). The steps of blocks 508-516 may be repeated (arrow 520) with respect to the additional given software handler including the packet processing hardware 12 being configured to: transfer one or more regions of the metadata 606 (which could be different regions than the regions transferred for the given software handler 610) to the input-output buffer 42 based on the handler configuration of the addition software handler; and call the additional software handler to perform processing associated with the packet 602 which causes the processing unit 18 to execute the addition software handler, which is configured to perform processing based on the transferred region(s) of the metadata 606; and in response to the additional software handler completing the processing associated with the packet 602, transfer one or more registers of the input-output buffer 42 to the packet metadata 606 based on the handler configuration of the additional software handler. The step of block 518 may be repeated to yield yet another action to call a further software handler, and so on.

After the various steering actions 608, 620 have been completed, the packet processing hardware 12 provides an updated packet (e.g., with an updated packet headers 604) and a steering decision (block 622).

Reference is now made to FIG. 8, which is a dataflow diagram 800 illustrating data handling according to the methods of FIGS. 5 and 7. FIG. 8 shows a parsed packet header 802 prior to an action (e.g., to call software handler 610) being performed. The parsed packet header 802 includes data fields F1, F2 and F3. The packet processing hardware 12 is configured to transfer (arrows 806) fields F1 and F2 to metadata 606. The term "transfer", as used in the specification and claims, may be defined to include copying data. A handler configuration 804 of the given software handler 610 may also be transferred to the metadata 606 (e.g., as part of the action).

The packet processing hardware 12 is configured to transfer (arrows 808) the one or more regions (e.g., F1 and F2) of the metadata 606 to one or more registers 810 of the input-output buffer 42 based on the handler configuration 804 of the given software handler 610. In some embodiments, the packet processing hardware 12 is configured to transfer the region(s) (e.g., F1 and F2) of the metadata 606 to the register(s) of input-output buffer 42 based on the handler configuration such that there is a gap 812 between the data in the input-output buffer 42 that did not exist in the data in the metadata 606 (i.e., in between the data F1 and F2 transferred from metadata 606). In some embodiments, packet processing hardware 12 is configured to transfer the region(s) of the metadata 606 to the register(s) 810 of input-output buffer 42 based on the handler configuration 804 such that the data is written to the input-output buffer 42 in a different order than the data (which is being transferred) is stored in the packet metadata 606. FIG. 8 shows that the data order is F1 then F2 in metadata 606, whereas the data order is F2 then F1 in the input-output buffer 42. In the example of FIG. 8, the software handler 610 reads the registers 810 including F1 and F2 and processes the read data to yield results including F2' and F3' which are written (arrows 816) to registers 814 in input-output buffer 42.

After completion of execution of software handler 610, the packet processing hardware 12 is configured to transfer (arrows 818) the register(s) 814 (e.g., including F2' and F3') of the input-output buffer 42 to the packet metadata 606 according to handler configuration 804 of the given software handler 610. In the example of FIG. 8 the registers 810 are different from registers 814. All the registers 810 may be different from registers 814 or only a subset of the registers 810 may be different from registers 814. In the example of FIG. 8, metadata 606 now includes F1, F2' and F3'. In the example of FIG. 8, F1 and F2 are used as input to the software handler 610, but the register location of F1 in input-output buffer 42 is not copied back to metadata 606 so that F1 is not overwritten in the packet metadata 606. The packet processing hardware 12 may be configured to transfer (arrows 820) F2' and F3' from metadata 606 to parsed packet header 802.

Figure 9:
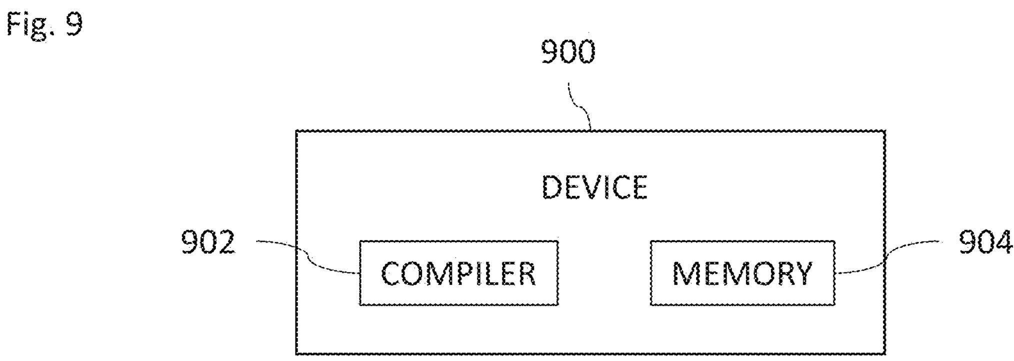
FIG. 9 is a block diagram view of a compiler device constructed and operative in accordance with an embodiment of the present invention.
Figure 10:
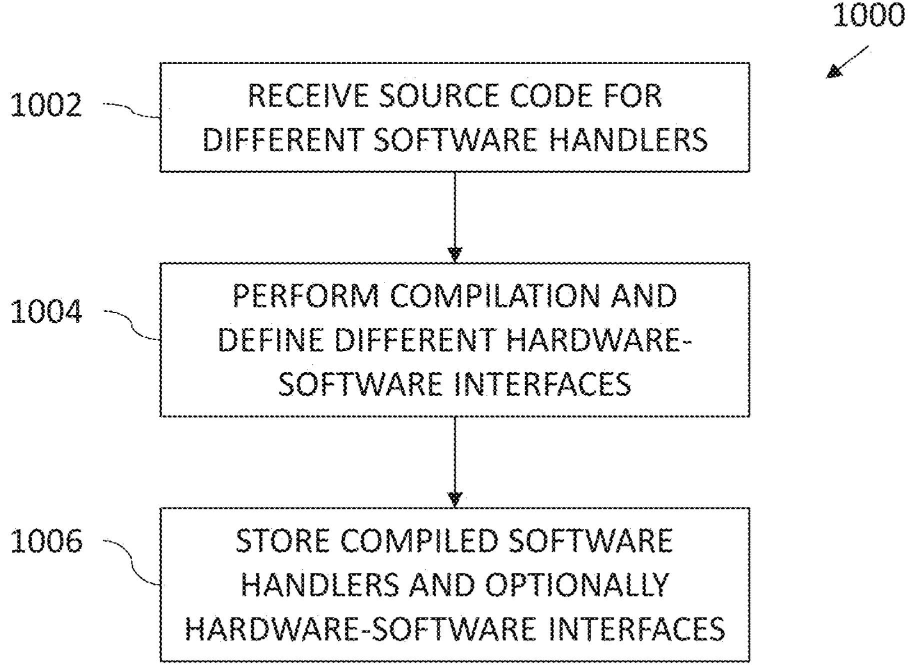
FIG. 10 is a flowchart including steps in a compilation method for use by the device of FIG. 9.

Reference is now made to FIGS. 9 and 10. FIG. 9 is a block diagram view of a compiler device 900 constructed and operative in accordance with an embodiment of the present invention. FIG. 10 is a flowchart 1000 including steps in a compilation method for use by the device 900 of FIG. 9. The compiler device 900 includes a software compiler 902 and a memory 904 to store the compiled software code.

In some embodiments, instead of using a hardware-software agreement to define how data in the registers of the input-output buffer 42 should be configured, when a given software handler code is written and compiled, the compiler 902 determines best register usage (e.g., the input and output register configuration of the input-output buffer 42) which works for the given software handler 610 without any concern for any prior defined hardware-software agreement. The register configuration defined by the compiler 902 for the given handler 610 may define the handler configuration 804 for the given software handler 610 and may be saved, e.g., into the binary of the given software handler 610.

Therefore, in some embodiments, software compiler 902 is configured to receive source code for different software handlers; perform compilation processes to (a) compile the source code of the different software handlers to yield respective compiled software handlers and (b) define different hardware-software interfaces (e.g., handler configuration 804) between a hardware processor (e.g., including packet processing hardware 12) and a processing unit (e.g., processing unit 18) for use by the respective compiled software handlers; and store the compiled software handlers and optionally the defined hardware-software interfaces in the memory 904. In some embodiments, the compiled software handlers are configured to perform a packet processing tasks.

Various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

The embodiments described above are cited by way of example, and the present disclosure is not limited by what has been particularly shown and described hereinabove. Rather the scope of the disclosure includes both combinations and sub-combinations of the various features described hereinabove, as well as variations and modifications thereof which would occur to persons skilled in the art upon reading the foregoing description and which are not disclosed in the prior art.

What is claimed is:

1. A network device, comprising:

a network interface to receive first packets from a network and send second packets over the network;

a processing unit to execute software handlers;

an input-output buffer to store data used by the processing unit; and packet processing hardware to:

parse a header of a packet and maintain metadata of the packet;

determine an action to be performed for the packet including calling a given software handler;

transfer at least one region of the metadata to the input-output buffer based on a handler configuration of the given software handler; and call the given software handler to perform processing associated with the packet, wherein the processing unit is to execute the given software handler, which is to perform processing based on the transferred at least one region of the metadata.

2. The device according to claim 1, wherein the packet processing hardware is to:

in response to the given software handler completing the processing associated with the packet, transfer at least one first register of the input-output buffer to the packet metadata based on the handler configuration of the given software handler; and continue processing the packet.

3. The device according to claim 2, wherein:

the packet metadata includes a plurality of regions;

the input-output buffer includes a plurality of registers; and the handler configuration defines:

(i) only a subset of the plurality of regions of the packet metadata to be transferred to the input-output buffer; and (ii) only a subset of the plurality of registers of the input-output buffer to be transferred back to the packet metadata.

4. The device according to claim 3, wherein the packet processing hardware is to:

transfer the at least one region of the metadata to at least one second register of the input-output buffer based on the handler configuration; and transfer the at least one first register of the input-output buffer to the packet metadata, wherein the at least one first register is different from the at least one second register.

5. The device according to claim 3, wherein the packet processing hardware is to transfer the at least one region of the metadata to the at least one second register based on the handler configuration such that there is a gap between the data in the input-output buffer that did not exist in the data in the metadata.

6. The device according to claim 3, wherein the packet processing hardware is to transfer the at least one region of the metadata to the at least one second register based on the handler configuration such that the data is written to the input-output buffer in a different order than the data is stored in the packet metadata.

7. The device according to claim 2, wherein:

the packet processing hardware is to:

determine an additional action to be performed for the packet including calling a second software handler;

transfer at least a second region of the metadata to the input-output buffer based on a second handler configuration of the second software handler; and call the second software handler to perform processing associated with the packet;

the processing unit is to execute the second software handler, which is to perform processing based on the transferred at least second region of the metadata; and the packet processing hardware is to, in response to the second software handler completing the processing associated with the packet, transfer at least one third register of the input-output buffer to the packet metadata based on the second handler configuration of the second software handler.

8. The device according to claim 2, wherein the processing unit is to execute the given software handler to:

read the data from the input-output buffer;

compute at least one result based on the read data; and write the at least one result to the input-output buffer.

9. The device according to claim 8, wherein the packet processing hardware is to transfer at least part of the at least one result to packet metadata.

10. The device according to claim 8, wherein the packet processing hardware is to transfer header data from the header of the packet to the metadata based on handler specific configuration data, the transferred header data being used by the given software handler.

11. The device according to claim 1, wherein:

the packet processing hardware is to match data associated with the packet to the action responsively to at least one match-and-action table; and the action indicates details about execution of the given software handler.

12. A method, comprising:

receiving first packets from a network;

sending second packets over the network;

executing software handlers;

parsing a header of a packet;

maintaining metadata of the packet;

determining an action to be performed for the packet including calling a given software handler;

transferring at least one region of the metadata to an input-output buffer based on a handler configuration of the given software handler;

calling the given software handler to perform processing associated with the packet; and executing the given software handler to perform processing based on the transferred at least one region of the metadata.

13. The method according to claim 12, further comprising:

in response to the given software handler completing the processing associated with the packet, transferring at least one first register of the input-output buffer to the packet metadata based on the handler configuration of the given software handler; and continuing processing the packet.

14. The method according to claim 13, wherein:

the packet metadata includes a plurality of regions;

the input-output buffer includes a plurality of registers; and the handler configuration defines: (i) only a subset of the plurality of regions of the packet metadata to be transferred to the input-output buffer; and (ii) only a subset of the plurality of registers of the input-output buffer to be transferred back to the packet metadata;

the transferring the at least one region includes transferring the at least one region of the metadata to at least one second register of the input-output buffer based on the handler configuration; and the transferring the at least one first register includes transferring the at least one first register of the input-output buffer to the packet metadata, wherein the at least one first register is different from the at least one second register.

15. The method according to claim 14, wherein the transferring the at least one region includes transferring the at least one region of the metadata to the at least one second register based on the handler configuration such that there is a gap between the data in the input-output buffer that did not exist in the data in the metadata.

16. The method according to claim 14, wherein the transferring the at least one region includes transferring the at least one region of the metadata to the at least one second register based on the handler configuration such that the data is written to the input-output buffer in a different order than the data is stored in the packet metadata.

17. The method according to claim 13, further comprising:

determining an additional action to be performed for the packet including calling a second software handler;

transferring at least a second region of the metadata to the input-output buffer based on a second handler configuration of the second software handler; and calling the second software handler to perform processing associated with the packet;

executing the second software handler to perform processing based on the transferred at least second region of the metadata; and in response to the second software handler completing the processing associated with the packet, transferring at least one third register of the input-output buffer to the packet metadata based on the second handler configuration of the second software handler.

* * * * *